United States Patent
Leibold et al.

(10) Patent No.: US 6,736,881 B2
(45) Date of Patent: May 18, 2004

(54) METHOD AND ARRANGEMENT FOR CLEANING PIPE-SHAPED FILTER ELEMENTS

(75) Inventors: Hans Leibold, Malsch-Waldprechtsweier (DE); Robert Mai, Karlsruhe (DE); Bernd Zimmerlin, Rheinstetten (DE); Karsten Schulz, Ammerthal (DE)

(73) Assignees: Forschungszentrum Karlsruhe GmbH, Karlsruhe (DE); Pall Corporation, East Hills, NY (US)

( * ) Notice: Subject to any disclaimer, the term of this patent is extended or adjusted under 35 U.S.C. 154(b) by 89 days.

(21) Appl. No.: 09/967,063

(22) Filed: Sep. 28, 2001

(65) Prior Publication Data

US 2002/0014156 A1 Feb. 7, 2002

Related U.S. Application Data

(63) Continuation-in-part of application No. PCT/EP00/03123, filed on Apr. 7, 2000.

(30) Foreign Application Priority Data

Apr. 16, 1999 (DE) .......................... 199 17 165

(51) Int. Cl.[7] .......................... B01D 46/00; B01D 29/66
(52) U.S. Cl. .......................... 95/280; 55/302; 55/417; 55/418; 55/482; 55/484; 55/523; 137/10; 137/12; 137/14

(58) Field of Search ................... 95/279, 280; 55/301, 55/302, 303, 417, 418, 419, 420, 482, 484, 523; 137/2, 10, 12, 14

(56) References Cited

U.S. PATENT DOCUMENTS 5,328,492 A    7/1994   Zievers et al.

FOREIGN PATENT DOCUMENTS

EP    0 551 951    7/1993

*Primary Examiner*—Duane Smith
*Assistant Examiner*—Jason M. Greene
(74) *Attorney, Agent, or Firm*—Klaus J. Bach

(57) ABSTRACT

In a method and apparatus for cleaning pipe-shaped filter elements arranged in a housing including a separation wall dividing the housing into a clean gas space and a raw gas space into which the filter elements extend from the clean gas space through the separation wall and the raw gas is directed from the raw gas space through the filter elements into the clean gas space while dust is removed from the raw gas and collected on the filter elements, the filter elements are cleaned from time to time by supplying momentarily pressurized flushing gas to the clean air space which, at the same time, is closed to generate a flushing gas pulse providing for a backflow of clean gas from the clean gas space to the raw gas space, which dislodges dust collected on the filter elements.

8 Claims, 3 Drawing Sheets

METHOD AND ARRANGEMENT FOR CLEANING PIPE-SHAPED FILTER ELEMENTS

This is a Continuation-In-Part of international application PCT/EP00/03123 filed Apr. 7, 2000 and claiming the priority of German application 199 17 165.3 filed Apr. 16, 1999.

BACKGROUND OF THE INVENTION

The invention relates to a method and arrangement for cleaning pipe-shaped filter elements through which raw gas is conducted from a raw gas space into a clean gas space, in which a safety filter is disposed. The filter elements are cleaned by backflushing from the clean gas space. As filter elements, mainly tube-like filter cartridges as they are used for the hot gas filtration are considered herein but the method is applicable to all tubular or hollow cylindrical filter elements.

In conventional filter cleaning systems, the cleaning intensity is limited by the speed of sound as upper limit for the cleaning gas flow through the filter channels. Since in filter cartridges, the pressure which is necessary for the dislodging of the deposits is derived from the kinetic energy of the gas flow, the obtainable pressure is limited. The operational behavior is further deteriorated when the filter has a high flow resistance for example by fine dust particles lodged in the filter, by a high dust content or by high filtration speeds. It is therefore difficult or impossible to clear filters by back flushing once they are clogged.

The method according to the present invention is specifically concerned with the high temperature particle filtration particularly of ceramic filter cartridges. Of particular concern is the protection of the plant during cleaning especially if a filter element breaks during cleaning.

For cleaning the filter elements or cartridges, it is presently common practice to apply pressure pulses at the clean gas side of the filters. However, with long filter cartridges with small inner diameters only relatively small cleaning effects can be achieved at the ends of the cartridge. In principle, the pressure of the flushing medium must be twice the pressure of the system during normal filtering operation in order to achieve a good cleaning effectiveness. Usually the pressure during filtering operation is 6 bar. In the pressurized coal conversion, the cleaning pressure to which cleaned product gas or $N_2$ is to be compressed must be between 15 and 60 bar to provide an appropriate cleaning gas pressure. Furthermore, breakage of a filter cartridge results in high dust emissions whereby the dust can be carried in combined gas/steam turbine plants into the gas turbine resulting in damage to the gas turbine. It is therefore desirable that means are provided which permit continued power plant operation even if a filter cartridge breaks. To achieve this, generally there is provided a second filter stage in the form of a safety filter arranged in the gas flow downstream of the filter cartridge.

EP 0 551 951 A1 discloses such a method for filter cartridges through which raw gas flows from the outside to the inside wherein a safety filter is arranged in the clean gas space downstream of each filter cartridge. Cleaning of the filter cartridge is achieved by back flashing of the filter cartridge from the clean gas space by a gas jet entering the filter cartridge. This however, does not result in a good cleaning of the filter cartridge. In addition, there are cleaning gas losses through the safety filter.

It is therefore the object of the present invention to provide a method for the cleaning of filter cartridges with which, on one hand, the cleaning of the filters is improved and which, on the other hand, provides for the cleaning of the filter cartridges even if a filter cartridge or a row of filter cartridges breaks, without a carryover of contamination into the clean gas flow.

SUMMARY OF THE INVENTION

In a method and apparatus for cleaning pipe-shaped filter elements arranged in a housing including a separation wall dividing the housing into a clean gas space and a raw gas space into which the filter elements extend from the clean gas space through the separation wall and the raw gas is directed from the raw gas space through the filter elements into the clean gas space while dust is removed from the raw gas and collected on the filter elements, the filter elements are cleaned from time to time by supplying momentarily pressurized flushing gas to the clean air space which, at the same time, is closed to generate a flushing gas pulse providing for a backflow of clean gas from the clean gas space to the raw gas space, which dislodges dust collected on the filter elements.

Details of the invention will become apparent from the following description thereof on the basis of the accompanying drawings.

DETAILED DESCRIPTION OF THE INVENTION

Figure 1:
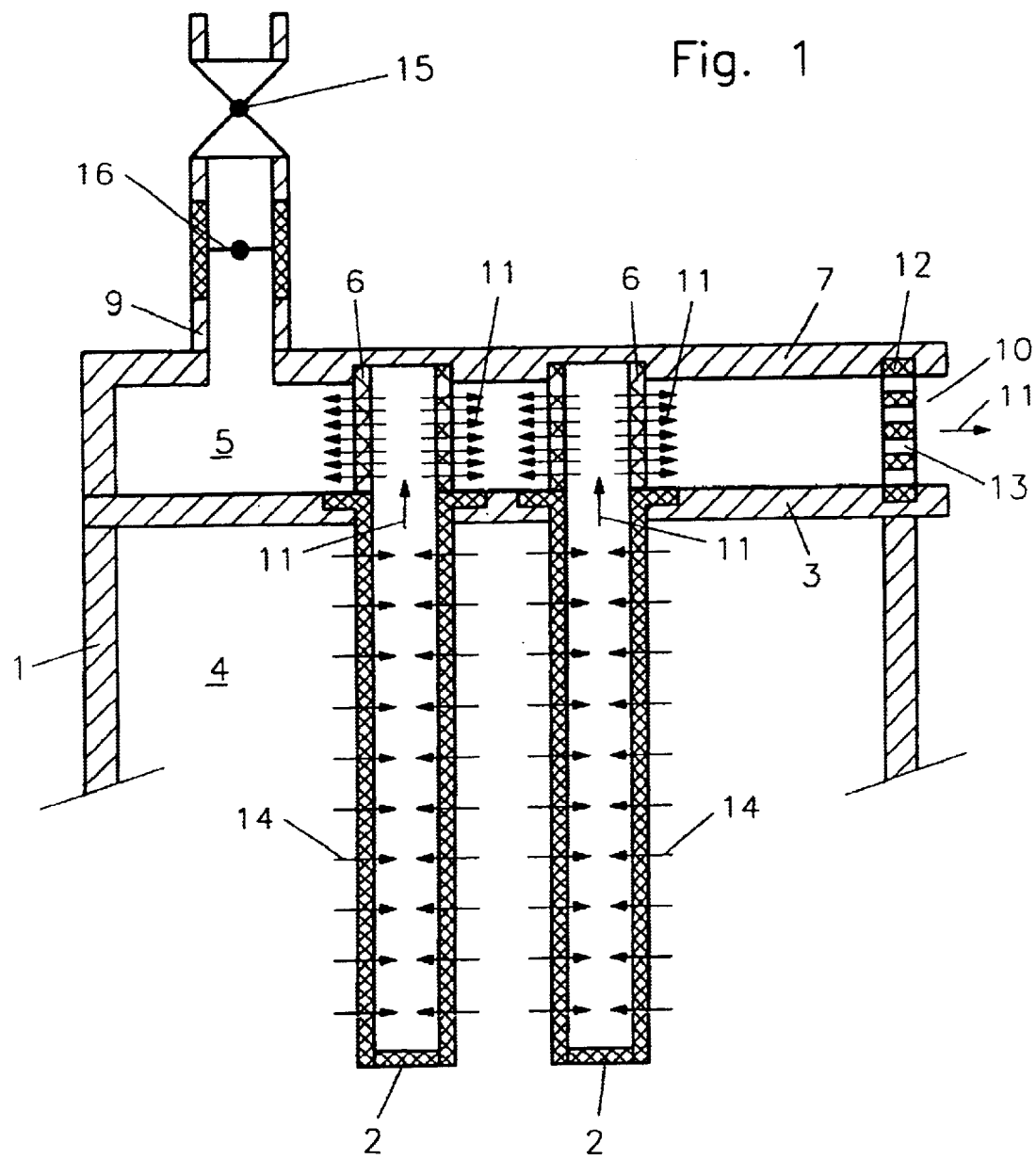
FIG. 1 shows a filter apparatus arrangement for performing the method according to the invention wherein the gas flow is indicated as it occurs during normal filtration operations.
Figure 2:
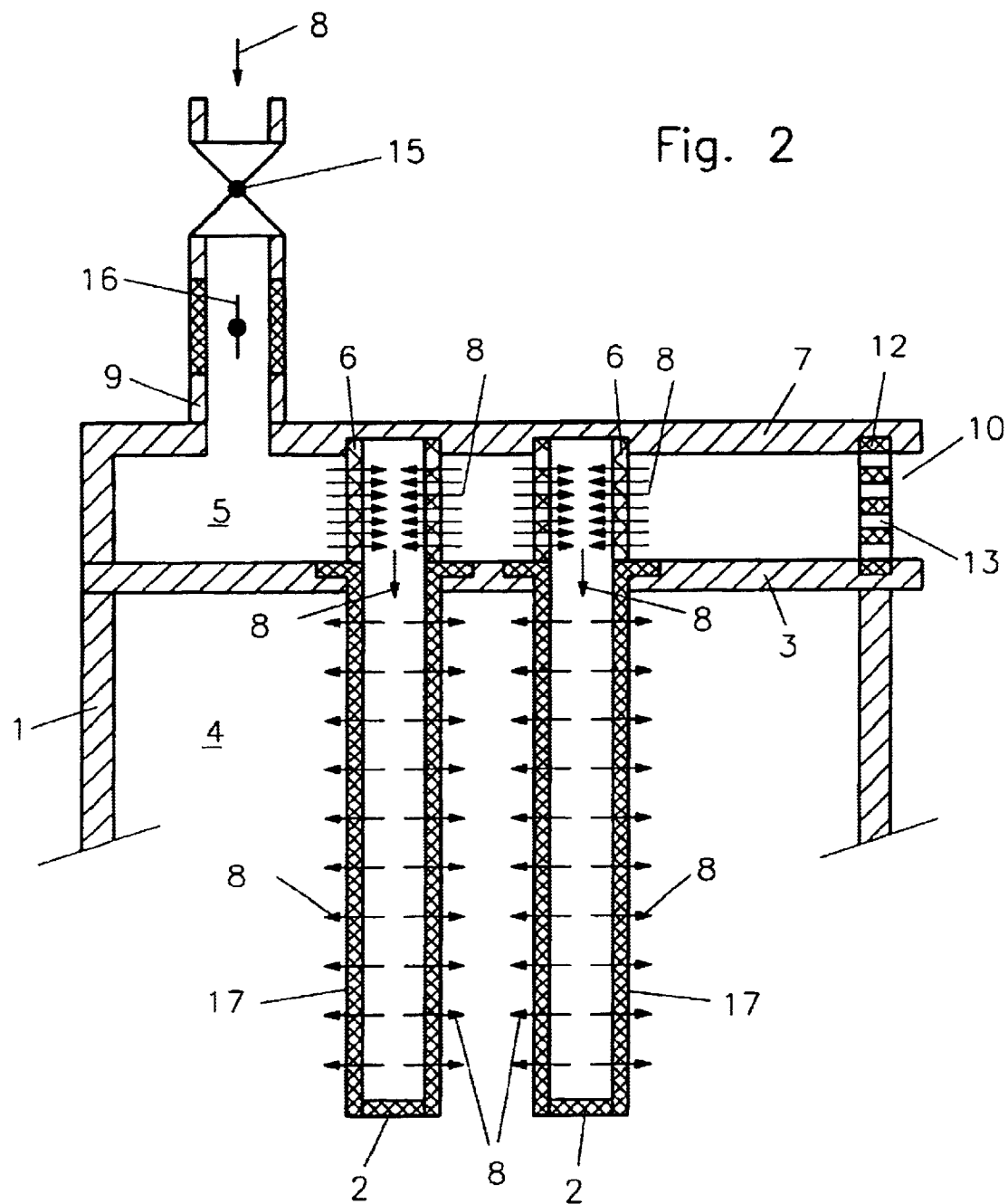
FIG. 2 shows the same filter apparatus indicating however the gas flow during back flushing.

FIGS. 1 and 2 show schematically a filter housing 1 which is divided by a separation wall 3 into a raw gas space 4 and a clean gas space 5. Into the separation wall 3 filter cartridges 2 are installed from the top as shown in FIG. 1 in a simplified manner. The filter cartridges 2 are preferably tubular ceramic filter elements into which the raw gas to be cleaned is directed from below. Filtering plants generally include a plurality of filter cartridges arranged in rows or clusters to form filter batteries which are not shown in detail but for which the method according to invention could be applied equally well. The filter cartridges as shown in FIGS. 1 and 2 may be considered to represent such rows or clusters of filter elements.

In the clean gas space 5 downstream of the filter cartridges 2,—in the flow direction of the gas to be cleaned—there are safety filters 6, which are disposed directly above, that is in axial alignment with, the filter cartridges 2. They are contained between the filter cartridges 2 and a cover 7 of the housing 1. The safety filters 6 have larger pores than the filter cartridges 2 and therefore a greater permeability.

In the embodiment shown, the safety filters are formed by tubular ceramic elements which are open downwardly toward the filter cartridges 2, but which are closed at the top by the cover 7 of the housing 1, so that gas flow can be established through the safety filter from the filter cartridge to the clean gas space as well as vice versa from the clean gas space into the filter cartridge. One or more connecting lines 9 extend through the cover 7 for supplying back flushing air 8 to the filter cartridges 2 for dislodging and flushing out particles or dust deposited on the raw gas side of the filter cartridges 2 in the raw gas space 4. For admitting the flushing air 8, the connecting line 9 is provided with a rapidly opening cleaning cycle valve 15. Between the valve 15 and the hot clean gas space 5, there is provided on additional highly temperature resistant flap valve 16. With this flap valve, the temperature sensitive backflashing valve 15 can be protected during high temperature operations from being subjected to excessive temperatures of the hot clean gas.

The clean gas space 5 is closed at its end adjacent the clean gas outlet channel 10 by a control element which permits passage of the cleaned gas, but prevents passage of the flushing air 8 into the outlet channel 10. This control element consists of a flow-dynamic pneumatic valve or porous control element 12, which has no moving parts and which is open when the pressure in the clean gas space 5 is relatively low as it is during filtering operations, but which closes when the relatively high-pressure back flushing air is admitted to the clean gas space 5.

In a particular advantageous embodiment, the control element 12 consists of a porous ceramic element, which is shown—enlarged in the schematic representation of FIGS. 1 and 2—provided with passages 13 extending from the clean gas space 5 to the outlet channel 10. The ratio of open passage area to the remainder of the material of the control element 12 is so selected that, during filtering operation, the flow resistance is relatively low, but that, during the backflushing or, respectively, cleaning operation, which occurs in a pulsed manner with relatively high pressures, the flow resistance is so high that the flow of gas through the porous control element 12 is practically blocked. In this way, it becomes possible to direct the backflush flow of flushing gas from the clean gas space 5 to the raw gas space 4 through the safety filters 6 and the filter cartridges 2. As control elements for closing the outlet channel 10 also devices other than the porous ceramic element 12 may be used. It is however advantageous for high temperature operation if the control element has no moving parts. It is important that the safety filters 6 have a higher permeability than the filter cartridges 2 and the control element 12 has a higher permeability than the safety filter 6.

The operation of the backflushing valve 15 and of the flap valve 16 is as follows:

During normal filter operation in accordance with the FIG. 1, the flap valve 16 is closed and thereby protects the backflushing valve 15 from direct heat exposure. Upon initiation of a cleaning procedure, first the flap valve 16 is opened which is achieved within seconds. Then the rapidly opening backflushing valve 15, which has a switching time in the range of several 10 msec is opened and the flushing air flows successively through the back flushing valve 15 and the flap valve 16 into the clean gas space 5. From there, the flushing air passes through the safety filter 6 and the filter cartridges 2 to the dust particles collected on the outside of the filter cartridges 2.

The dust layer 17 on the outside of the filter cartridges 2 is dislodged and removed from the filter cartridges 2 in the process. After completion of the backflashing procedure, first the backflushing control valve 15 closes and then the flap valve 16. Since the backflushing step is completed within a period of less than 1 sec, the flap valve 16 is open for only a few seconds during which the control valve 15 may be exposed to high temperatures.

With the direct coupling of the back flushing unit for one or more filter cartridges 2 by way of the porous safely filter 6, on one hand, the backflushing intensity can be adjusted as desired and, on the other hand, the safety filters 6 act as integrated safety elements. The control element 12 described earlier makes it possible to achieve a high effectiveness of the back flushing as 8 and also for the cleaned gas flow 11. The achievable back flushing intensity is determined alone by the static pressure in the backflushing system. It is therefore no longer hydraulically limited and can be adjusted in accordance with the excess pressure needed in the filter cartridges 2. Particularly in the critical inlet area of the filter cartridges, the backflushing intensity can be increased in this way, with, at the same time, a substantially reduced backflushing pressure (see FIG. 4). Even clogged filter cartridges can be freed with the method according to the invention since the backflushing intensity is almost independent of the filter cartridge loading condition.

The control element 12 consists preferably of a honeycomb-like body with through passages having a cross-section in the area of a few $mm^2$. As material for the honeycomb-like body ceramic material such as SiC, $Al_2O_3$, Cordierit, or Spinell may be used. However, it may also consist of a porous materials such as foams, metal fibers or fabric or other fiber materials, corn ceramics or sinter metals with a system of open pores of a few 100 μm cross-section diameters. The porous materials may be $Si_3N_4$, $ZrO_2$, SiC, $AlO_3$ or Spinell.

Characteristic operating values of the method according to the invention:

Pressure of the backflushing air 8: 0.5 to 1 bar above the system pressure,

Pressure loss in the filter cartridge 2 and the safety filter 6: 500 to 1000 Pa at 5 cm/sec flow speed through the filter.

Pressure loss in the control element 12: 30 to 250 Pa at 2.5 cm/sec.

The pressure loss referred to is always the pressure loss determining the permeability.

Figure 3:
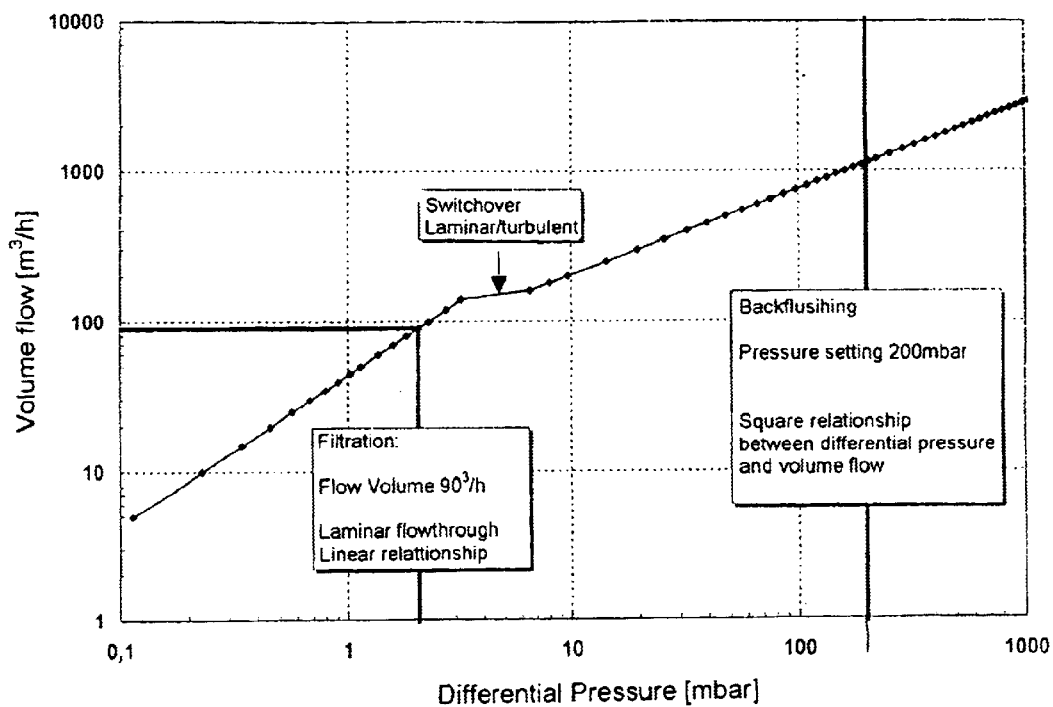
FIG. 3 shows the volume flow over the pressure difference indicating the transition between laminar and turbulent flow.

FIG. 3 shows the transition between laminar flow and turbulent flow on the basis of a plotting of the volume over the pressure difference at the control element of an arrangement including three filter cartridges. During filtering operations, the pressure difference is up to 2 mbar with a volume flow of 90 $m^3$/hr. Up to this point, the flow in the passages 13 of the control element is laminar. The relationship between volume flow and differential pressure is linear. If the values are increased, in this case by the admission of back flushing air 8, the flow in the passages 13 is converted from laminar to turbulent. Backflushing occurs at a pressure of about 200 mbar. Since the flow in the passages has become turbulent, the pressure losses are substantially increased so that the control element is practically blocking.

Figure 4:
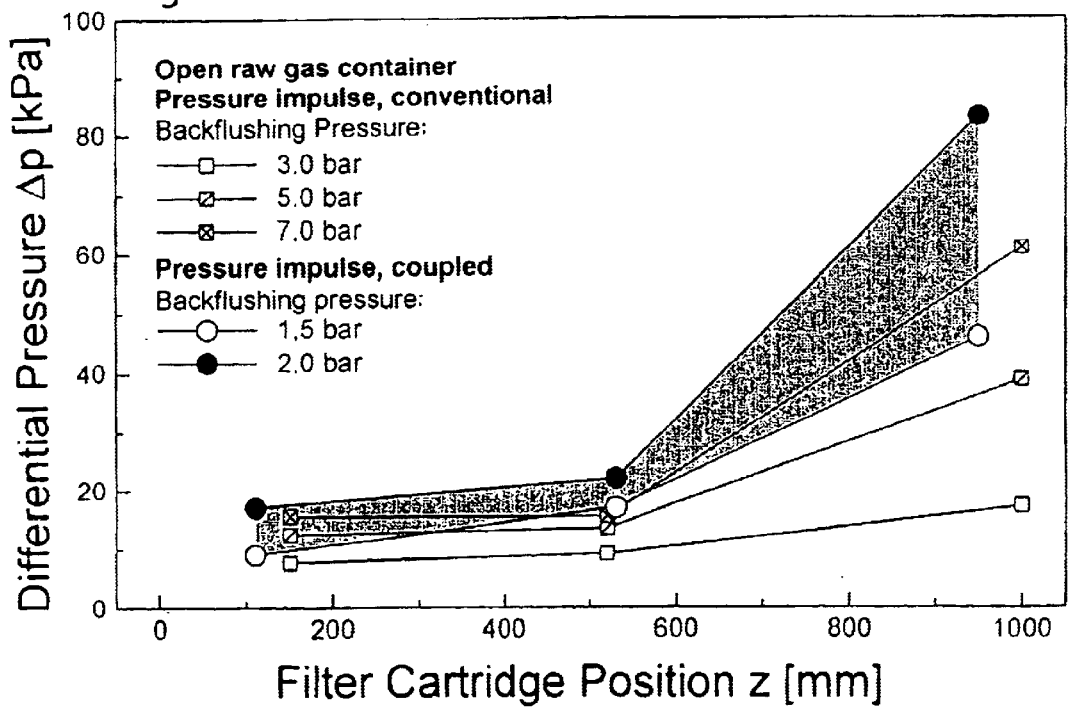
FIG. 4 shows the cleaning intensity of the method according to the invention in comparison with conventional methods.

FIG. 4 shows the cleaning intensity (backflushing effectiveness) over the length of a filter cartridge (circles) at certain cartridge locations, in comparison with conventional methods (squares). The backflushing pressure are listed: With the method according to the invention, relatively low pressures are required to obtain at the various filter cartridge locations relatively high backflushing pressure differences which provide for an effective cleaning of the filter cartridges.

As a result, the method according to the invention substantially reduces the chances of dust infiltration into the plant system. Besides, the individually mounted safety filters guarantee at any time, that is also in case of a breakage of a filter cartridge, that the required clean gas dust content limits are not exceeded. Furthermore, any undamaged filter cartridges can safely remain in operation: Filter cartridges 2 arranged in a row or in the same cluster as a damaged element can still be used without the possibility of causing contamination of the clean gas area. Only the damaged filter cartridge needs to be replaced. Another advantage of the arrangement according to the invention is that no pipes are required in the high temperature area of the filter arrangement. The required safely filters 6 are simply placed on top of the filter cartridges or they may even be provided as part of the filter cartridges.

The control element 12 may be firmly installed in the clean gas duct. The whole filtering arrangement can then be very compact. For the backflushing, an excess pressure of only 0.5 to 1 bar is required independent of the system pressure. With a relatively high system pressure, this is quite advantageous. During most of the backflushing procedure only hot gas from the clean gas space of the apparatus enters the filter cartridges 2. The backflushing air mainly increases the pressure in the clean air space. The ceramic filter cartridges are therefore not subjected to high temperature changes or thermo-shocks. The control valves 15 and 16 for the backflushing air may be arranged at a greater distance from the cover 7 in order to reduce their exposure to high temperatures.

What is claimed is:

1. A method for cleaning pipe-shaped filter elements arranged in a housing including a separation wall dividing the housing into a clean gas space and a raw gas space into which the filter elements extend from the clean gas space through the separation wall, said raw gas space including means for supplying raw gas thereto and said clean gas space including an outlet for discharging clean gas therefrom and also a backflushing inlet for supplying momentary backflushing gas pulses to the clean gas space during filtering operation, for backflushing the filter elements and a flow-dynamic control element disposed in said outlet to limit gas flow through said outlet when said backflushing gas pulses are supplied to said clean gas space, said method comprising the steps of supplying, for cleaning said filter element, backflushing gas pulses to said clean gas space through said backflushing inlet under a pressure exceeding the raw gas pressure, while said outlet is blocked for momentarily forcing the gas in said clean gas space back through said filter elements into said raw gas space thereby dislodging any dust collected on said filter elements.

2. A method according to claim 1, wherein said backflushing inlet includes a flap valve arranged between a backflushing control valve and said clean gas space, said method comprising the step of opening said flap valve and then shortly opening said backflushing valve to provide a backflushing gas pulse to said filter elements.

3. A method according to claim 1, wherein said backflushing gas pulses through said filter elements consist mainly of clean hot gas.

4. An arrangement for cleaning pipe-shaped filter elements arranged in a housing with a separation wall dividing the housing into a raw gas space and a clean gas space, at least one tubular filter cartridge having a closed end and being mounted in said separation wall so as to extend with its closed end into said raw gas space, the open end of said tubular filter cartridge being disposed in said clean gas space, a safety filter element engaged between said at least one filter cartridge in said clean gas space and a cover of said housing, means for supplying raw gas to be cleaned to said raw gas space for passage through said at least one filter cartridge and said safety filter element into said clean gas space, an outlet arranged in said clean gas apace for discharging the clean gas therefrom, a flushing gas inlet with a flushing gas control valve connected to said clean gas space for supplying backflushing gas pulses to said clean gas space and a flow-dynamic control element having no moving parts disposed in said clean gas outlet which permits passage of the cleaned gases out of said clean gas space but which essentially blocks passage when backflushing gas pulse under a pressure exceeding the raw gas pressure in the raw gas space is admitted to said clean gas space through said flushing gas inlet.

5. An arrangement according to claim 4, wherein said flushing gas inlet includes a temperature resistant flap valve disposed between said flushing gas control valve and said clean air space to protect said flushing gas control valve from excessive temperatures.

6. An arrangement according to claim 4, wherein said flow-dynamic control element consist of a body having a plurality of parallel passages extending through said body and having cross-sections capable of restricting gas flow therethrough during backflushing operation.

7. An arrangement according to claim 4, wherein said flow-dynamic control element consists of a ceramic material.

8. An arrangement according to claim 7, wherein said ceramic material is selected from the group consisting of SiC, $A_2O_3$, Cardierit and Spinell.

* * * * *